Dec. 12, 1939. R. S. NELSON Re. 21,298

ROOM COOLING APPARATUS

Original Filed Nov. 12. 1931

Witness:
R. B. Davison.

Inventor:
Rudolph S. Nelson:
By: H. S. Demarest
Atty

UNITED STATES PATENT OFFICE 21,298

ROOM COOLING APPARATUS

Rudolph S. Nelson, Larchmont, N. Y., assignor to The Hoover Company, North Canton, Ohio, a corporation of Ohio Original No. 1,975,859, dated October 9, 1934, Serial No. 574,610, November 12, 1931. Application for reissue May 31, 1938, Serial No. 211,102

21 Claims. (Cl. 62—140)

This invention relates to refrigerating apparatus and more particularly to air conditioning apparatus designed to be mounted in the wall of a building and adapted to cool and dehumidify the air therein.

In the construction of buildings, as for example large office buildings, it is customary for the windows on one floor to be directly above those on the floor beneath. Since the sill of the window is usually several feet above the floor, there is a space between the window of one floor and that of the floor below which cannot be used to support weight and which, if filled with solid building material, merely adds to the total weight of the building.

It is an object of the present invention to utilize this space to house and conceal refrigerating apparatus adapted to cool the air in the room in which the window is located.

A further object of the invention is to provide air-cooled refrigerating apparatus of a compact assembly and of a unitary structure which can be easily placed in and removed from the wall of a building in which it may be located.

A further object is to provide a novel design for a building so as to adapt the same to receive individual room coolers without utilizing space normally occupied by other appurtenances.

Other objects and advantages will be apparent from the following description of the invention taken in connection with the accompanying drawing in which.

Figure 1:
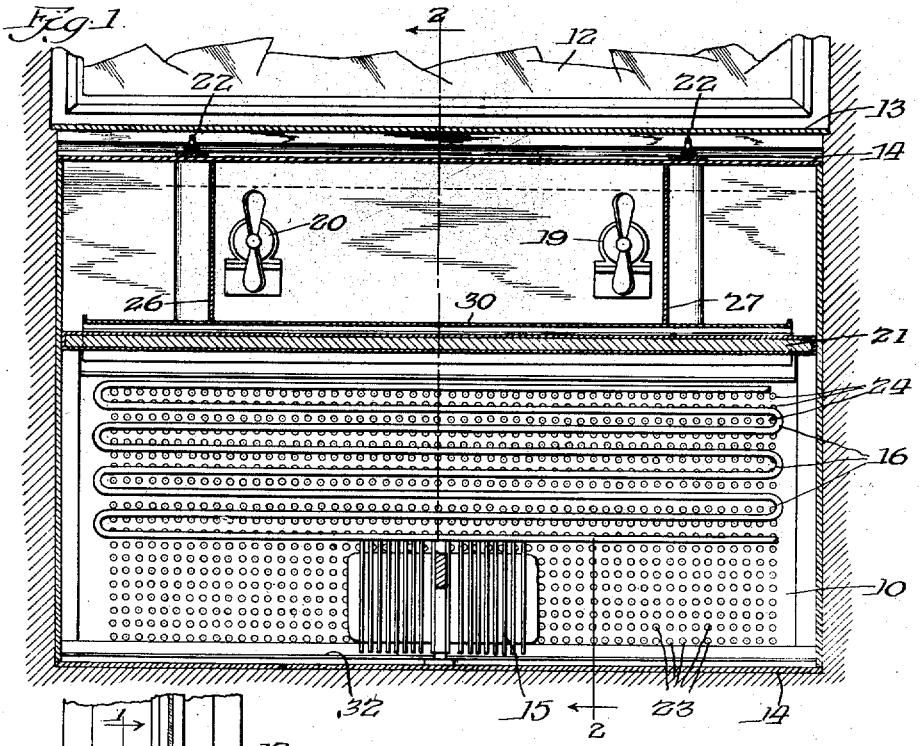
Figure 1 is a vertical cross-sectional view taken on the line 1—1 of Figure 2 of a refrigerating apparatus mounted in the wall of a building in accordance with the principles of the invention and Figure 2 is a vertical cross-sectional view of the apparatus of Figure 1 taken on the line 2, 2 thereof.

Referring to the drawing, it will be noted that my novel air conditioning unit is designed to be positioned in a hollow opening in an outer wall of a room to be conditioned. As shown, the hollow opening is beneath a window 12, and extends from the window sill 13 to the floor of the room. A panel member 10 is shown as lying flush with the outer surface of the room wall, while a second panel 11 cooperates therewith as well as with sill 13 and the inner side of the wall to provide a housing or casing for concealing the air conditioning unit. Sill 13, upon which the lower sash of window 12 seats, is hinged to the top of panel 10 as clearly appears in Figure 10, and forms a cover through which the unitary, portable air conditioning apparatus may be readily installed or removed as desired.

The portable air conditioning assembly comprises a frame formed for example from four in-turned channel members 14 suitably secured together and arranged to fit snugly in the hollow housing provided by the room wall, panels 10, 11 and sill 13. Refrigeration apparatus is secured to the frame members and includes a hermetically sealed motor-compressor 15, a condenser coil 16, an evaporator 17, together with an expansion valve and connecting pipes (not shown) which go to make up a complete compression type refrigeration system. The motor-compressor unit illustrated is of the type shown in United States Letters Patent No. 1,704,655, to Crane.

Figure 2:
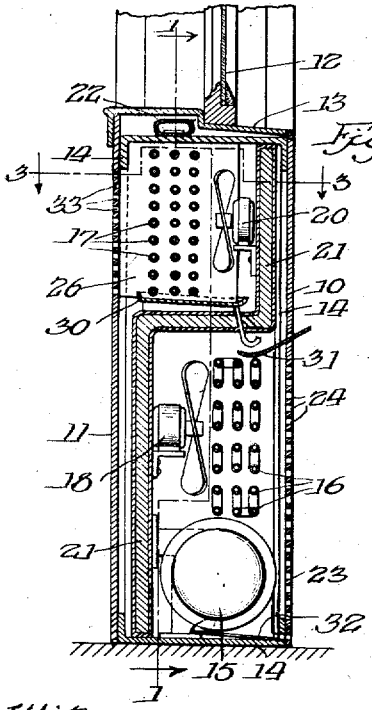

To properly insulate the evaporator 17 from the motor-compressor 15 and the condenser 16, in order to avoid heat losses between the condenser chamber and the evaporator chamber both during hot weather and cold weather, a suitable insulating partition is provided as indicated at 21, this member extending from the top of the frame 14 to the bottom and from side to side thereof. As shown in Figure 2, the insulating partition 21 is angle shaped. In this way the motor-compressor 15 and the condenser 16 are located in a compartment exposed to the atmosphere on the outside of the building while the evaporator 17 is located in a compartment in communication with the air in the room to be cooled. It will therefore be apparent that the heat absorbing portions only of my air conditioner are in communication with the room to be conditioned, while the heat dissipating elements, such as the condenser and the motor-compressor unit, are heat insulated from the room being conditioned and are in direct communication with the outside atmospheric air.

A motor driven fan 18 causes outside air to circulate over the motor compressor unit 15 and the condenser 16. As shown in Figure 2, the condenser 16 and fan 18 may be located above the motor compressor unit 15, the fan 18 causing a current of air to enter through lower openings or holes 23 in the outer panel member 10 and pass over the motor compressor unit and thence upwardly across the condenser 16 and out through an upper set of holes 24 in member 10. Thus the motor-compressor and the condenser 16 may be adequately air-cooled.

Figure 3:
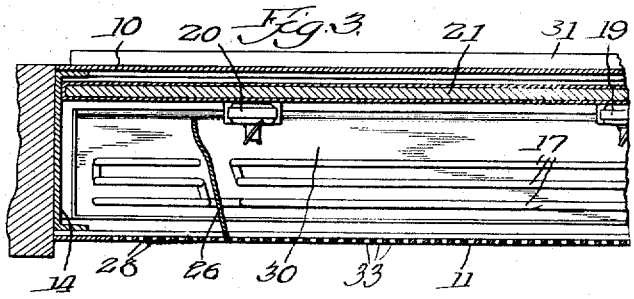
Figure 3 is a fragmentary horizontal cross-sectional view of the apparatus of Figures 1 and 2 taken on the line 3—3 of Figure 2.

Similarly, fans 19 and 20 cause air to circulate over the coils of the evaporator 17, the air being removed from and returned to the room. As shown in Figures 2 and 3, the upper portion of member 11 is provided with openings 28 near the opposite ends of the evaporator compartment and openings 33 in the central portion thereof. Baffles 26 and 27 are arranged between sets of coils of the evaporator 17, as indicated in Figure 3 and cooperate with the fans 19 and 20 to cause separate streams of relatively warm and moist room air to enter through openings 28, pass across the two end coils of the evaporator and thence across the main central coil thereof and back into the room through the center holes 33.

The arrangement shown is intended to illustrate only one way in which the air might be directed and it is within the scope of the invention to cause the air to flow upwardly through the inner portion of the window sill 13 by merely providing holes in that member and changing the angular position of the fans 19 and 20. Other arrangements for circulating the air may also be employed.

Due to the fact that the evaporator coil 17 is maintained at a temperature considerably lower than that of the room, moisture present in the recirculated room air will condense thereon as the air from the room passes thereover. The water so collected will eventually collect in the drip pan 30 positioned below the evaporator 17. This water may be conveniently disposed of without resorting to drain pipe connections or other means by conveying the same from the drip pan by a conduit passing through wall 21, as shown in Figure 2, and discharging the condensate onto the distributing trough 31. Trough 31 extends lengthwise of the condenser 16 and is so constructed and arranged so that the condensate drips onto the condenser coils and flows thereover in a thin film. The condenser 16 being warmer than the air outside of the building, the water which drips onto the condenser will evaporate, and will not only be wasted into the cooling air stream, but will facilitate the cooling of the condenser in so doing. Thus the formation of condensate on coil 17 not only results in the dehumidification of the air in the room being cooled, but also in the evaporative cooling of the condenser 16.

While the condenser 16 is essentially an air-cooled condenser, the efficiency of the unit may be improved not only by the water which drips on to the condenser 16 from the evaporator 17 but also by water which may be collected in rainy weather. To accomplish this a trough 31 may be provided as shown in Figure 2, the trough having a portion extending through an opening in the outer member 10 and disposed at a slight angle to catch rain water which may be running down the outside of the building.

Any water which may not have evaporated on the condenser coil 16 drips on to the motor compressor unit and is returned to the outside of the building by means of the drip pan 32.

It will be seen that the entire refrigerating unit may be removed from the housing concealing the same for repair or replacement by merely removing the trough 31, raising the window 12, swinging the hinged sill 13 outwardly and lifting the unit by the handles 22 attached to the frame 14.

While an arrangement has been shown in which the motor compressor and the condenser are largely air-cooled, it is obvious that the invention is not limited to air-cooled apparatus. It may be advantageous in some localities and under some circumstances to water-cool these parts. As is well known, one of the great difficulties in air cooled compression units is the high back pressure of the condenser. It might be necessary to actually have a water conduit to supply water to the exterior of the condenser, or a wick connected with a reservoir, or perhaps a spray actuated by the fan motor. By this means it should be possible to cool the condenser even below the atmospheric temperature. An advantage of thus cooling the condenser is that a smaller unit can be used for a capacity equivalent to that obtained with an air-cooled condenser and a larger motor compressor. It is also obvious that the operation of the unit may be controlled in various ways as by thermostatically operated switches in the electric circuit to the motor in accordance with principles now well known to those skilled in the art. Various changes in the arrangement and the construction of parts may be made without departing from the spirit of the invention or the scope of the annexed claims.

I claim:

1. The combination with the wall of a building having a window and a concealed compartment immediately beneath the window, of a supporting frame mounted in said compartment, an insulating partition carried by said frame and dividing the compartment into two chambers, refrigerating apparatus carried by said frame and including an evaporator located in one chamber and a heat discharging element located in the other chamber, means for causing air in the building to flow across said evaporator and means for causing air from outside the building to flow across said heat discharging element to air cool the same.

2. The combination with the wall of a building having a window and a concealed compartment immediately beneath the window of a supporting frame mounted in said compartment, an insulating partition carried by said frame and dividing the compartment into two chambers, refrigerating apparatus carried by said frame and including an evaporator located in one chamber and a motor-compressor and a condenser located in the other chamber, means for causing air to flow across said evaporator and into a room in the building and means for causing air from outside the building to flow across said motor-compressor and said condenser to thereby air cool the same.

3. In combination, a wall of a building having a hollow portion, refrigerating apparatus mounted therein and having a cooling element, a heat discharging element and insulating means between said elements, means for directing air inside the building over said cooling element to cool the air and cause moisture therein to collect on said cooling element, means for conveying the moisture so collected into heat transfer relation with said heat discharging element and means for directing air outside of the building over said heat discharging element to cause the moisture thereon to evaporate and assist in the discharge of heat therefrom.

4. In combination, a wall of a building having a hollow portion, refrigerating apparatus mounted therein and having a cooling element, a heat discharging element and insulating means between said elements, means for directing air inside the building over said cooling element, means for bringing water in heat transfer relation with said heat discharging element and means for directing air outside of the building over said heat discharging element to cause the water to evaporate and assist in the discharge of heat therefrom.

5. In combination, a wall of a building having a hollow portion, refrigerating apparatus mounted therein and having a cooling element, a heat discharging element and insulating means between said elements, means for directing air inside the building over said cooling element, means for directing air outside of the building over said heat discharging element and means for collecting rain water during rainy weather and bringing it in heat transfer relation with said heat discharging element to assist in causing heat to be discharged therefrom.

6. In combination with the wall of a room to be conditioned, a self-contained, encased, air-cooled air-conditioning apparatus of the room type mounted in said wall and constructed and arranged to communicate with the outside atmosphere through said wall, said apparatus including a frame, a heat insulating partition cooperating with said frame and with the casing to provide an upper chamber on one side of the apparatus and a lower compartment on the opposite side thereof, said partition cooperating with said casing and frame to prevent transfer of appreciable quantities of heat or air between said room and the outside atmosphere, a mechanical refrigeration unit concealed by said casing and including an evaporator in said upper chamber and an air-cooled condenser in said lower chamber, means for circulating room air through the upper chamber and over the evaporator therein to cool and dehumidify the air before it is returned to the room, means for circulating outside air through the lower chamber and over the condenser therein to cool the condenser, means for collecting condensate in said upper chamber and conveying the same into the lower chamber, the arrangement being such that said condensate is heated from said air-cooled condenser and is discharged to the outside in the condenser cooling air stream.

7. An encased, concealed, air-cooled air-conditioning device mounted in the wall of a room to be conditioned and constructed and arranged to have its interior communicate with the atmosphere through said wall, said device comprising a supporting structure, a weatherproof partition of insulating material cooperating with said supporting structure to divide said interior into two chambers one of which communicates with the room to be conditioned and the other of which communicates with the outside air, and which partition also substantially seals the room air chamber from the outside air chamber to prevent transfer of air and heat therebetween, a refrigerating apparatus including an evaporator in said first named chamber and a condenser in said second chamber, a perforated member extending over said first chamber, means in each of said chambers, one operable to circulate room air through one chamber and one operable to circulate outside air through the other chamber, means for collecting condensate formed in the first chamber and conducting it to the second chamber for wastage to the outside air, and a plurality of motors connected to drive said refrigeration apparatus and air circulating means.

8. A portable unitary air conditioning apparatus mounted in a hollow opening in a wall of a room to be conditioned, a housing concealing said apparatus, a heat insulating partition within said housing providing chambers at different elevations therewithin, mechanism associated with said partition and including an evaporator unit in one of said chambers, and a refrigerant condensing unit assembly on the opposite side thereof and in another of said chambers, means for withdrawing air from the room and passing the same over said evaporator to lower the temperature of the air, condense moisture therefrom and then return the cooled, dried air to the room, means for passing outside air into heat exchange relation with said condensing unit assembly and then back to the outside to cool the same, said heat insulating partition serving to insulate the condensing unit cooling air stream from the room air stream, and means for utilizing the cold moisture condensed from the air circulating over the evaporator to assist in the cooling of the condensing unit assembly.

9. The combination with an outer wall of a room to be conditioned having a hollow opening, of a portable, self-contained, air cooled, air conditioning apparatus mounted in said opening, a housing concealing said apparatus therewithin, a heat insulating partition in said housing dividing the same into a plurality of chambers and constructed and arranged to seal the interior of the room from the outside air, said apparatus including a frame, said partition providing an upper chamber on one side and a lower chamber on the opposite side thereof, a mechanical refrigeration unit extending through said partition including an evaporator in said upper chamber and an air-cooled condenser in said lower chamber, means for circulating room air through the upper chamber and over the evaporator therein to cool and de-humidify the air before it is returned to the room, means for circulating air from outside the room through the lower chamber and over the condenser therein to cool the condenser therein, means for collecting moisture condensed out of the room air in said upper chamber and discharging the moisture over the condenser whereby the condenser is cooled by evaporation of moisture and all of the moisture is conveyed from the apparatus in the condenser cooling air stream.

10. The combination with the wall of a room having a hollow opening, of an air conditioning apparatus of the self-contained, portable type mounted in said opening and readily removable therefrom, a housing for concealing said apparatus therewithin, an insulated partition dividing the housing into two compartments and providing a weather-tight closure for said opening and preventing the transfer of air between the room and the outside air, means in said housing placing one of said chambers in communication with said room and the other in communication with the outside atmosphere, said air conditioning apparatus including mechanical refrigeration means in said housing including an evaporator in said room air compartment and an air cooled condensing unit in the other compartment, means to circulate room air over said evaporator to cool the room and outside air over said condenser to cool the condenser, means for collecting moisture separated from the air circulating over the evaporator and disposing of the same to the outside air by conveying said moisture into heat transfer relation with said condensing unit whereby the moisture is evaporated, and a plurality of motors connected to drive said condensing unit and air circulating means.

11. The combination with a room to be conditioned having a wall with a window, of an air conditioning device mounted in a hollow opening below said window, means housing said device and concealing the same from view, said device being self-contained in framework and readily removable as a unit from said opening, and from said housing, said housing having a front wall on the room side formed for the passage of air therethrough and a back wall formed for the entrance and exit of outside air, said device including an insulated partition in said framework dividing the housing into two chambers and serving to prevent the transfer of heat between the room to be conditioned and the space outside the room, a mechanical refrigerating apparatus having a heat absorbing element in the chamber communicating with the room and heat dissipating elements including a motor-compressor in the other chamber, motor driven means in each of said chambers one of which means is operable to withdraw air from spaced points in the room, pass it over said heat absorbing element and return the conditioned air to the room, and the other of which means is operable to circulate outside air over said heat dissipating elements in order to cool the same.

12. The combination with a hollow opening in the wall of a room to be conditioned, of a self-contained, portable air conditioning apparatus of the air-cooled type, means cooperating with said wall to conceal said apparatus, said means having a room air inlet, a room air outlet, an outside cooling air inlet and an outside cooling air outlet, said apparatus including an insulating partition within said concealing means dividing the same into a first chamber in communication with said room air inlet and outlet, and a second chamber in communication with said cooling air inlet and outlet, a mechanical refrigeration mechanism having an evaporator located in said first chamber and a motor-compressor-condenser assembly connected thereto and located in said second chamber and operable to supply liquid refrigerant to said evaporator, power driven means in said first chamber positioned to draw air from the enclosure through said inlet, pass the air over the evaporator to cool and dehumidify the same, and then to discharge the cooled, dried air into the enclosure to condition the same, a second power-driven means positioned to circulate outside cooling air through said second chamber and over the motor-compressor-condenser assembly therein to cool the same, and then discharge the air to the outside again, condensate collecting means in the first chamber to collect moisture condensed out of the room air by the evaporator, and means for wasting said condensate from the apparatus by passing it into the presence of the outside cooling air stream whereby the condensate is picked up by said air stream and carried from the apparatus, said portable air conditioning apparatus being removable as a unit from said concealing means.

13. The combination with the wall of a building having a hollow opening of a portable, air-cooled air conditioning apparatus, said apparatus being concealed within a housing structure mounted within said wall opening and having a frame-work, the interior of said housing being in communciation with the outside atmosphere and with the space on the inside of said wall, said apparatus including an insulating partition and a refrigeration apparatus supported within but independently of said concealing housing, said refrigeration apparatus including a cooling element and an air-cooled heat discharging element disposed on opposite sides of said partition, said cooling element being arranged so as to permit it being exposed to the air on the inside of said wall and said heat discharging element being so disposed as to permit discharge of heat to the air on the outside of the wall, said insulating partition and said housing being adapted to cooperate with portions of the wall to substantially seal said cooling element from said heat discharging element, means for collecting condensate from said cooling element and dissipating it to the outside air to which the heat of said heat discharging element is transferred, and means for circulating outside air over said heat discharging element and inside air over said cooling element.

14. The combination with an outer wall of a room to be conditioned, of a unitary, portable, air conditioning apparatus, a casing concealing said apparatus mounted in a hollow opening in said wall and provided with openings communicating with the outside atmosphere, said conditioning apparatus including an insulating partition and a refrigerating mechanism, said refrigerating mechanism including a heat absorbing element and an air-cooled heat discharging assembly disposed on opposite sides of said partition, said assembly comprising an air-cooled hermetically sealed motor-compressor unit, said heat absorbing element being arranged so as to permit it being exposed to a stream of room air to absorb heat and condense moisture therefrom, and said heat discharging assembly being so disposed as to permit transfer of heat to a stream of outside air as it passes over said assembly, said insulating partition and said casing being adapted to cooperate with portions of said wall to substantially seal said heat absorbing element and the interior of the room from said heat discharging assembly so that the heat therefrom is not conducted to the room air, and means for collecting moisture condensed from the room air and discharging it onto said heat discharging assembly to cool the same.

15. The combination with the wall of an enclosure having a hollow opening for receiving an air-cooled air conditioning apparatus, of a self-contained, air conditioning apparatus of the air-cooled type and adapted to condition said enclosure, said apparatus comprising a casing for enclosing and concealing the operative portion thereof, said casing having a room air inlet and a room air outlet, said casing also having an outside cooling air inlet and an outside cooling air outlet, an insulating partition within said casing dividing the same into a first chamber in communication with said room air inlet and outlet, and a second chamber in communication with said cooling air inlet and outlet, a mechanical refrigeration mechanism housed within and concealed by said casing and having an evaporator located in said first chamber and a motor-compressor-condenser assembly connected thereto and located in said second chamber and operable to supply liquid refrigerant to said evaporator, the motor-compressor of said assembly being a hermetically sealed, unitary assembly having heat radiating means, power-driven means in said first chamber positioned to draw air from the enclosure through said inlet, pass the air over the evaporator to cool and dehumidify the same, and then to discharge the cooled, dried air into the enclosure to condition the same, a second power-driven means positioned to circulate outside cooling air through said second chamber and over the motor-compressor-condenser assembly therein to cool the same, and then discharge the air to the outside again, a condensate collecting means in the first chamber to collect moisture condensed out of the room air by the evaporator, and means for disposing of said condensate from the apparatus by passing it onto said motor-compressor-condenser assembly in the presence of the outside cooling air stream circulating thereover whereby the condensate is picked up by said air stream and carried from the apparatus.

16. The combination with a hollow opening in the wall of a room to be conditioned, of a room air conditioning device including refrigeration apparatus which is unitary, air-cooled and portable, said apparatus being mounted in a frame and comprising an evaporator, a motor-compressor and an air-cooled condenser connected in circuit, a partition interposed between said evaporator and said motor-compressor-condenser unit to assist in providing a room air compartment for the evaporator and a cooling air compartment for the motor-compressor-condenser unit, means positioned to collect condensate from said evaporator and to dispose of the same into the cooling air for the condenser, a housing concealing said refrigeration apparatus and said frame, said housing having room air inlet and discharge passages leading into and from said evaporator compartment, and cooling air inlet and outlet passages leading into and from said cooling air compartment, said device being so constructed and arranged that said frame with its associated apparatus, and said housing therefor, may be removed one from the other as a unit, and said conditioning device also being so constructed and arranged in said wall opening that said room air passages communicate with the room and so that said cooling air passages communicate with the air outside said room.

17. The combination with a hollow opening in the wall of a room to be conditioned, of a unitary room air conditioning device comprising a framework, an air-cooled refrigeration apparatus on said framework including a motor-compressor unit, a condenser unit and an evaporator unit, said framework and refrigerating apparatus being portable, a housing concealing said framework and refrigeration apparatus, insulated partition means cooperating with said housing to provide an evaporator compartment and a second compartment for the motor-compressor-condenser unit, said evaporator unit being at a higher elevation than one of said other units, an air inlet opening and an air outlet opening for said evaporator compartment, an air inlet opening and an air outlet opening for said second compartment, means for circulating air to be cooled and dehumidified through the evaporator compartment, means for circulating cooling air through the said second compartment to cool the units therein, condensate collecting means in the evaporator compartment, means for transferring the condensate to said other compartment and disposing of the same into the cooling air whereby it is discharged from said device, said housing and framework with its associated refrigeration apparatus being so constructed and arranged that one may be readily removed from the other, and said conditioning device being so positioned and arranged in said wall opening that said evaporator compartment air openings are in communication with the room and the air openings of said second compartment are in communication with the outside air.

18. An air conditioning device comprising a housing positioned in a hollow opening in a wall of a room, a self-contained, unitary, portable air-conditioning apparatus fitted within said housing to be concealed thereby when in operative position, said apparatus including a partition cooperating with said housing to divide the interior thereof into two chambers one of which is in communication with the room through an air inlet opening and an air outlet opening in said housing, refrigeration mechanism associated with said partition including an evaporator located in said one chamber and a condensing unit located in the other chamber, means for circulating room air through the chamber containing the evaporator and back to the room, and means for circulating outside air in heat exchange relation to said condensing unit to cool the same, said housing and said air conditioning apparatus being so constructed that the one may be readily removed from the other as a unit.

19. In combination an air conditioning device including a housing positioned in a hollow opening in a wall of a room to be conditioned, a self-contained, unitary, portable air conditioning apparatus concealed in said housing in said wall opening and including a partition dividing the housing into a room air compartment and an outside air compartment, refrigeration mechanism including a condenser and an evaporator, said mechanism being so disposed with respect to said partition that the evaporator is in said room air compartment and the condensing unit is in said outside air compartment, both of said compartments being horizontally elongated and said first named compartment being located above said second compartment, a room air inlet in said housing near one end of said room air compartment, and an air outlet therefrom in said housing, means for circulating air inwardly through the inlet, over the evaporator and through said outlet opening, and means for conveying condensate collected from said evaporator into direct heat transfer relationship with said condensing unit to cool the same.

20. An air conditioning device comprising a housing positioned in a hollow opening in a wall of a room, a self-contained, unitary, portable air-conditioning apparatus concealed in said housing and including a partition dividing the housing into a room air compartment and an outside air compartment, said housing and said unitary conditioning apparatus being readily removable one from the other, refrigeration mechanism including a condenser and an evaporator, said mechanism being so disposed with respect to said partition that the evaporator is in said room air compartment and the condensing unit is in said outside air compartment, both of said compartments being horizontally elongated and said first named compartment being located above the outside air compartment, room air inlets in said housing near the opposite ends of said elongated room air compartment and an air outlet in an upper portion of said housing intermediate said inlets, and means for circulating separate streams of air inwardly through said inlet, over the evaporator and for then passing the cooled dried air through said outlet into the room being conditioned.

21. In combination, a device for conditioning the air of a room in a building, said device being mounted in a wall of said room and including a housing formed in part by members serving to close a hollow opening in said wall and a unitary portable air-conditioning structure concealed by said housing, an insulating partition and a refrigerating apparatus mounted on said structure and forming a part thereof, said refrigerating apparatus comprising a cooling element and an air-cooled heat discharging element disposed on opposite sides of said partition, said cooling element being arranged so as to permit it being exposed to the air in the room and said heat discharging element being so disposed as to permit discharge of heat to the air outside of the room, said insulating partition being so disposed in said housing as to substantially seal said cooling element from said air-cooled heat discharging element.

RUDOLPH S. NELSON.